US012565177B1

(12) United States Patent
    Griffin

(10) Patent No.: US 12,565,177 B1
(45) Date of Patent: Mar. 3, 2026

(54) REMOTE SAFETY TIRE INFLATION APPARATUSES

(71) Applicant: James A. Griffin, Waskom, TX (US)

(72) Inventor: James A. Griffin, Waskom, TX (US)

( * ) Notice: Subject to any disclaimer, the term of this patent is extended or adjusted under 35 U.S.C. 154(b) by 0 days.

(21) Appl. No.: 18/747,937

(22) Filed: Jun. 19, 2024

(51) Int. Cl.
    *B60S 5/04*            (2006.01)

(52) U.S. Cl.
    CPC ........... *B60S 5/04* (2013.01); *Y10T 137/3662* (2015.04)

(58) Field of Classification Search
    CPC ................. B60S 5/04; Y10T 137/3662; Y10T 137/3646; Y10T 137/3677; G01L 19/10; G01L 19/12; F04F 5/48; F04F 5/50
    USPC ......... 137/226–230, 884; 141/38, 65, 59, 95
    See application file for complete search history.

(56)                References Cited

U.S. PATENT DOCUMENTS

| | | | | | |
|---|---|---|---|---|---|
| 938,522 | A | * | 11/1909 | Swain | ................... F04B 43/009 137/227 |
| 1,181,133 | A | * | 5/1916 | Hammond et al. | .......................... B60C 23/0496 137/227 |
| 1,258,079 | A | * | 3/1918 | Young | ...................... A62B 9/02 285/27 |
| 1,531,731 | A | * | 3/1925 | Burgess | .............. B60C 23/0496 137/227 |
| 1,618,953 | A | * | 2/1927 | Penn | ........................ B60S 5/043 137/227 |
| 1,699,378 | A | | 1/1929 | Smith | |
| 1,903,233 | A | * | 3/1933 | Gille | ........................ B60S 5/046 137/227 |
| 2,750,071 | A | | 6/1956 | Ritchie | |
| 4,333,491 | A | | 6/1982 | Knubley | |
| 4,388,027 | A | | 6/1983 | Blaimschein | |
| 4,397,445 | A | | 8/1983 | Burquier | |
| 4,535,821 | A | * | 8/1985 | Anderson | ............... B01F 35/56 137/625.48 |
| 4,742,857 | A | * | 5/1988 | Gandhi | ................. B60C 23/004 702/140 |
| 5,168,911 | A | * | 12/1992 | Gottschalk | .............. B60S 5/043 157/1 |
| 5,857,481 | A | | 1/1999 | Zimmerman et al. | |
| 6,067,850 | A | | 5/2000 | Lang et al. | |
| 7,174,925 | B2 | * | 2/2007 | Fritz, II | .................. B60S 5/043 141/38 |
| 8,746,293 | B2 | * | 6/2014 | Chou | .................... B29C 73/166 141/38 |
| 10,780,996 | B2 | * | 9/2020 | Sallman | ................. B64C 25/36 |
| 10,933,844 | B2 | * | 3/2021 | Spindler | ............ G05D 16/2066 |
| 11,027,707 | B1 | * | 6/2021 | Strong | ...................... F04F 5/48 |
| 11,046,128 | B2 | * | 6/2021 | Chou | .................... B60C 29/064 |
| 11,161,482 | B1 | | 11/2021 | Klingerman | |
| 11,891,025 | B2 | * | 2/2024 | Brown | .................... B60S 5/046 |
| 2019/0322247 | A1 | * | 10/2019 | Hibbard | .............. G05D 16/208 |

* cited by examiner

*Primary Examiner* — Craig J Price
(74) *Attorney, Agent, or Firm* — R. Keith Harrison

(57)                ABSTRACT

Remote safety tire inflation apparatuses may be operable in a tire inflation mode to inflate a pneumatic tire to an initial tire pressure at a safe distance from the tire. The remote safety tire inflation apparatuses may be operable in a tire deflation mode to subsequently deflate the tire to a safe target tire pressure so a user of the apparatus can safely approach the tire to uncouple the apparatus from the tire.

15 Claims, 13 Drawing Sheets

REMOTE SAFETY TIRE INFLATION APPARATUSES

FIELD

Illustrative embodiments of the disclosure are generally directed to apparatuses for inflating pneumatic tires. More particularly, illustrative embodiments of the disclosure relate to remote safety tire inflation apparatuses which facilitate remote inflation of a pneumatic tire at a safe distance from the tire in case of a blowout.

SUMMARY

Illustrative embodiments of the disclosure are generally directed to remote safety tire inflation apparatuses configured for pneumatic connection to an air compressor to remotely inflate a pneumatic tire to an initial tire pressure and subsequently deflate the tire to a target tire pressure. An illustrative embodiment of the remote safety tire inflation apparatus may include an air inlet valve configured for pneumatic connection to the air compressor. The air inlet valve may be selectively deployable in an open inlet valve position and a closed inlet valve position. An air inlet conduit may be disposed in pneumatic communication with the air inlet valve. An air pressure gauge may be disposed in pneumatic communication with the air inlet conduit. The air pressure gauge may be configured to measure and indicate pressure of air in the air inlet conduit. An air outlet conduit may be disposed in pneumatic communication with the air inlet conduit. The air outlet conduit may be configured for pneumatic connection to the pneumatic tire. An air bleed valve may be disposed in pneumatic communication with the air outlet conduit. The air bleed valve may be selectively deployable in an open bleed valve position and a closed bleed valve position. The air bleed valve may be configured to facilitate substantially free and unhindered discharge of tire bleed air from the air outlet conduit in the open bleed valve position and substantially block discharge of tire bleed air from the air outlet conduit in the closed bleed valve position.

In another aspect, the air inlet conduit may include a first inlet conduit end and a second inlet conduit end, the air inlet valve may be disposed in pneumatic communication with the first inlet conduit end and the air pressure gauge may be disposed in pneumatic communication with the second inlet conduit end.

In another aspect, the air outlet conduit may include a first outlet conduit end and a second outlet conduit end. The air bleed valve may be disposed in pneumatic communication with the first outlet conduit end. The second outlet conduit end may be configured for the pneumatic connection to the pneumatic tire.

In another aspect, an air transit conduit may establish pneumatic communication between the air outlet conduit and the air inlet conduit.

In another aspect, the air transit conduit may include a first transit conduit end disposed in fluid communication with the air inlet conduit and a second transit conduit end disposed in fluid communication with the air outlet conduit.

In another aspect, each of the air inlet conduit and the air outlet conduit may include discrete tubing segments.

In another aspect, the air inlet conduit may include a main inlet conduit segment tubing, and the air inlet valve and the air pressure gauge may be disposed in pneumatic communication with the main inlet conduit segment tubing.

In another aspect, the air outlet conduit may include a main outlet conduit segment tubing. The main outlet conduit segment tubing may be configured for pneumatic connection to the pneumatic tire. The air bleed valve may be disposed in pneumatic communication with the main outlet conduit segment.

In another aspect, the apparatus may include an apparatus block. The air inlet conduit and the air outlet conduit may extend within the apparatus block.

In another aspect, the apparatus block may be rubber, metal, plastic, composite material or combinations thereof.

In another aspect, the apparatus may include an apparatus mount rack configured to support the apparatus block.

In another aspect, at least one peg opening may be provided in the apparatus block. The apparatus mount rack may include a rack base and at least one rack peg on the rack base. The rack peg or pegs may be configured for extension through the peg opening or openings to support the apparatus block on the rack base.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
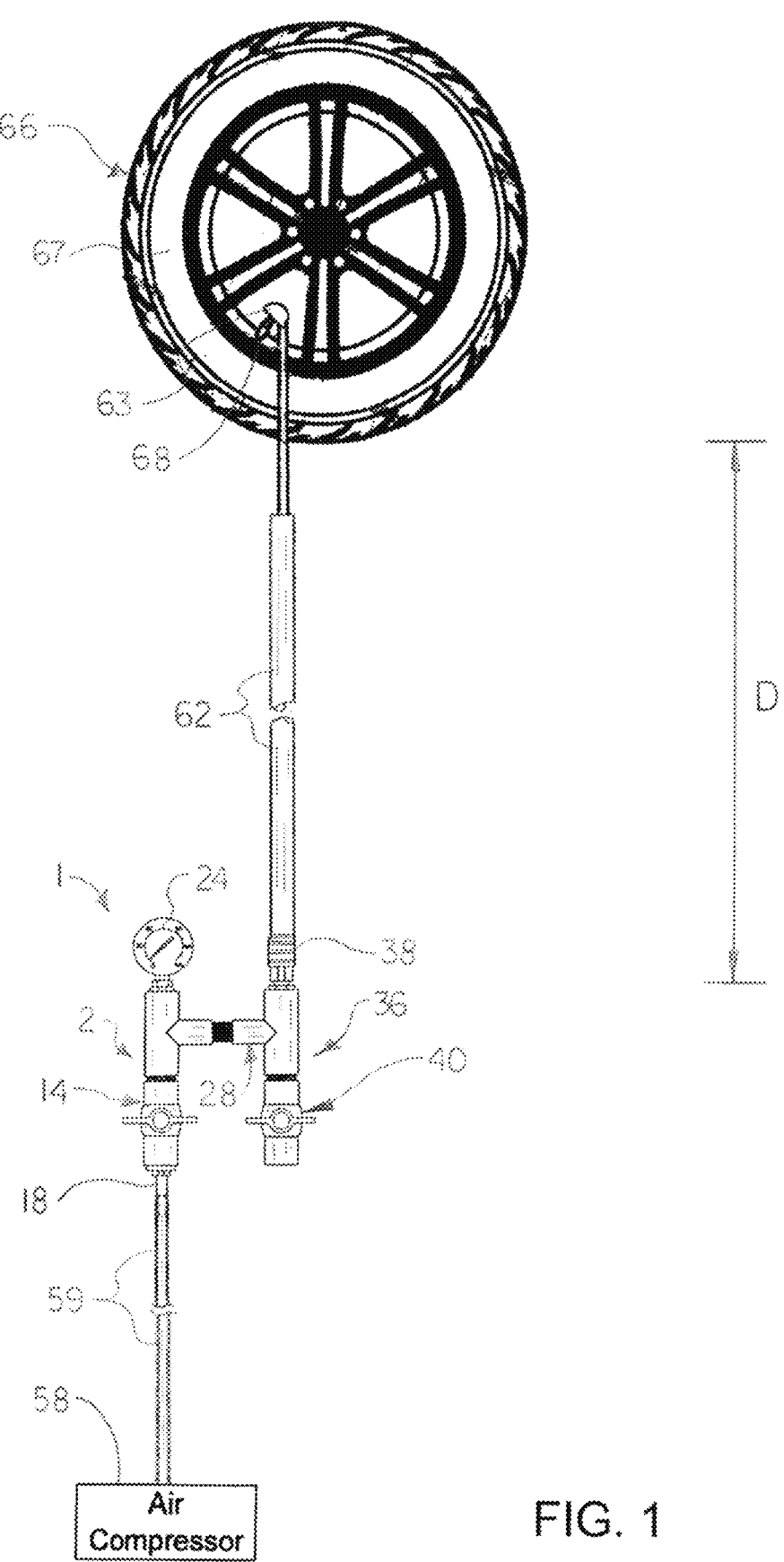
FIG. 1 is a front view of an illustrative embodiment of the remote safety tire inflation apparatuses, with an air compressor connected to the apparatus and the apparatus pneumatically coupled to a valve stem on a pneumatic tire for inflation of the tire in typical application of the apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

The term "or combinations thereof as used herein refers to all permutations and combinations of the listed items preceding the term. For example, "A, B, C, or combinations thereof" is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Referring initially to FIGS. 1-6 of the drawings, an illustrative embodiment of the remote safety tire inflation apparatuses, hereinafter apparatus, is generally indicated by reference number 1. As illustrated in FIG. 1 and will be hereinafter further described, the apparatus 1 may be configured for pneumatic connection to an air pump or compressor, hereinafter air compressor 58, typically through a suitable air inlet hose 59. The apparatus 1 may be configured for pneumatic connection, typically through an air outlet hose 62 having an air chuck or nozzle, hereinafter air nozzle 63, to a valve stem 68 on a pneumatic tire 67 which is fitted on a wheel 66 such as an automobile wheel, for example and without limitation. The apparatus 1 may be operable in a tire inflation mode which enables a user (not illustrated) to inflate the pneumatic tire 67 to an initial tire pressure at a safe distance D from the tire 66. The apparatus 1 may be operable in a tire deflation mode which enables the user to subsequently deflate the tire 66 to a safe target tire pressure for use of the tire 67 before the user approaches the tire 66 to disconnect the air nozzle 63 from the valve stem 68.

Figure 2:
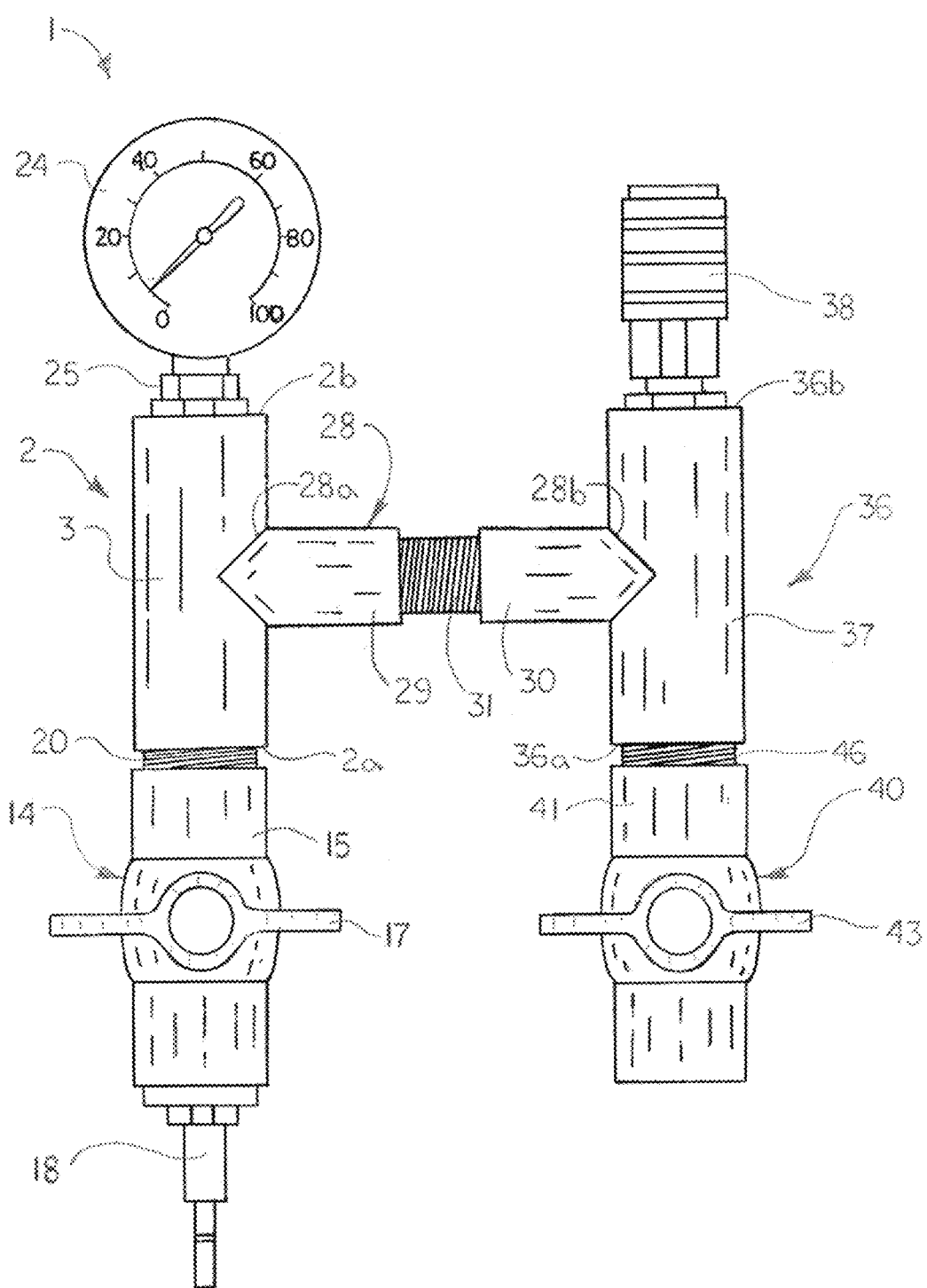
FIG. 2 is a front view of the illustrative remote safety tire inflation apparatus illustrated in FIG. 1.

As illustrated in FIG. 2, the apparatus 1 may include an air inlet valve 14. The air inlet valve 14 may be configured for pneumatic connection to the air compressor 58 (FIG. 1), typically through the air inlet hose 59. The air inlet valve 14 may be selectively deployable in an open inlet valve position, illustrated in FIG. 4, and a closed inlet valve position, illustrated in FIG. 6. In the tire inflation mode of the apparatus 1, illustrated in FIGS. 3 and 4, the air inlet valve 14 in the open inlet valve position may be configured to facilitate substantially free and unhindered flow of tire inflating air 50 (FIGS. 3 and 4) from the air compressor 58 through the air inlet hose 59, the apparatus 1 and the air outlet hose 62 into the pneumatic tire 67, respectively. In the tire deflation mode of the apparatus 1, illustrated in FIGS. 5 and 6, the air inlet valve 14 in the closed inlet valve position may be configured to substantially block flow of the tire inflating air 50 from the air inlet hose 59 into the apparatus 1.

An air inlet conduit 2 may be disposed in pneumatic communication with the air inlet valve 14. An air pressure gauge 24 may be disposed in pneumatic communication with the air inlet conduit 2. The air pressure gauge 24 may be configured to measure and indicate the pressure of air in the apparatus 1, typically as will be hereinafter described.

As further illustrated in FIG. 2, the air inlet conduit 2 may have a first inlet conduit end 2a and a second inlet conduit end 2b. The air inlet valve 14 may be disposed in pneumatic communication with the first inlet conduit end 2a of the air inlet conduit 2. The air pressure gauge 24 may be disposed in pneumatic communication with the second inlet conduit end 2b of the air inlet conduit 2.

An air outlet conduit 36 may be disposed in pneumatic communication with the air inlet conduit 2. The air outlet conduit 36 may be configured for pneumatic connection to the pneumatic tire 67, typically through the air outlet hose 62 and the air nozzle 63 (FIG. 1). An air bleed valve 40 may be disposed in pneumatic communication with the air outlet conduit 36. The air bleed valve 40 may be selectively deployable in an open bleed valve position, illustrated in FIG. 6 and a closed bleed valve position, illustrated in FIG. 4. In the tire deflation mode of the apparatus 1, illustrated in FIGS. 5 and 6, the air bleed valve 40 in the open bleed valve position may be configured to facilitate substantially free and unhindered discharge of tire bleed air 51 (FIG. 6) from the pneumatic tire 67 through the valve stem 68, the air nozzle 63, the air outlet hose 62 and the air outlet conduit 36 and discharge of the tire bleed air 51 through the air bleed valve 40, respectively. The air bleed valve 40 in the closed bleed valve position may be configured to substantially block discharge of the tire bleed air 51 from the air outlet conduit 36 or flow of the tire inflating air 50 (FIG. 4) from the air outlet conduit 36 through the air inlet valve 14.

The air outlet conduit 36 may have a first outlet conduit end 36a and a second outlet conduit end 36b. The air bleed valve 40 may be disposed in pneumatic communication with the first outlet conduit end 36a of the air outlet conduit 36. The second outlet conduit end 36b of the air outlet conduit 36 may be configured for the pneumatic connection to the pneumatic tire 67, typically as will be hereinafter described.

Figure 4:
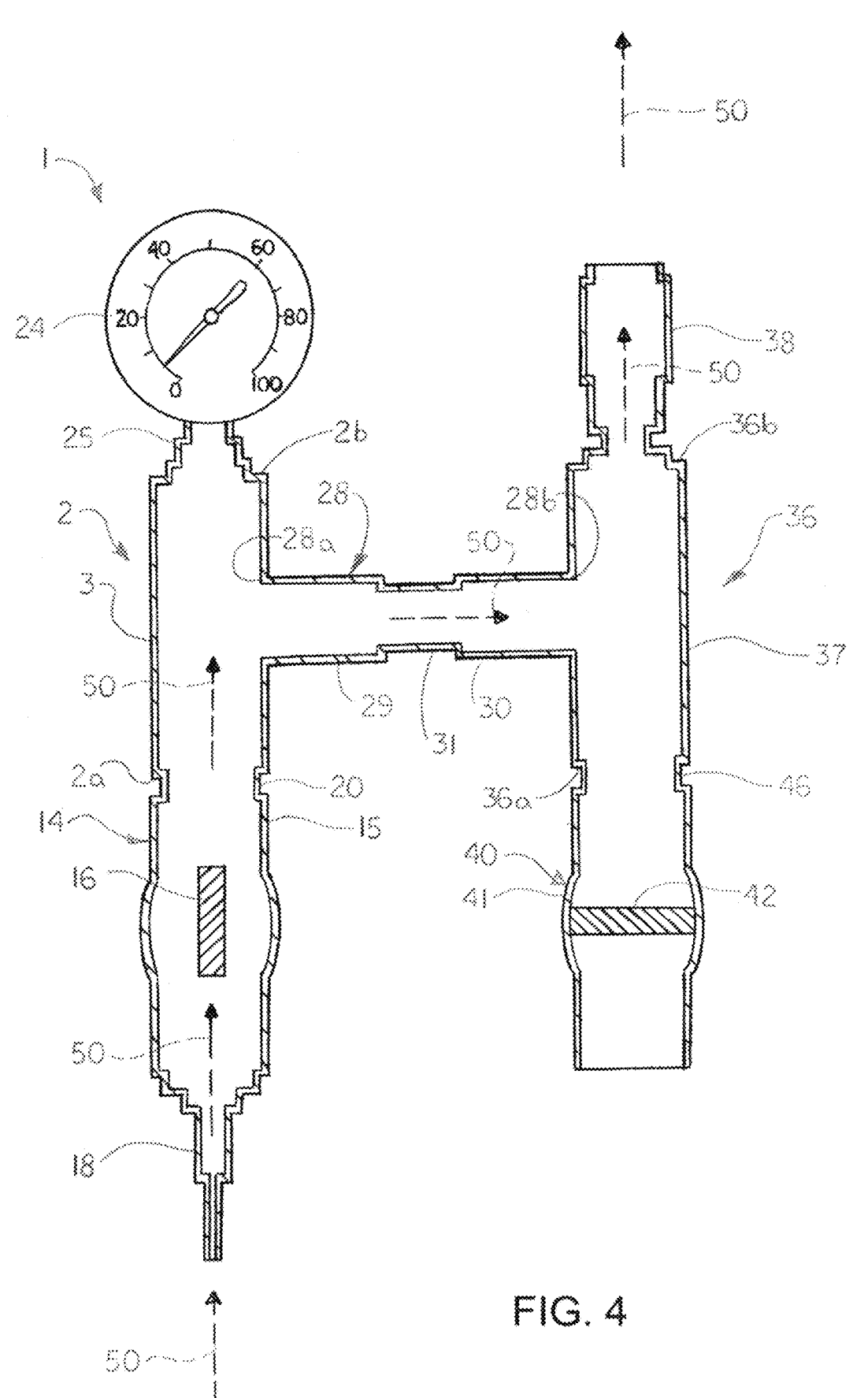
FIG. 4 is an enlarged sectioned interior view of the illustrative remote safety tire inflation apparatus illustrated in FIG. 3, illustrating the typical flow of the tire inflating air through the apparatus in the tire inflation mode.
Figure 6:
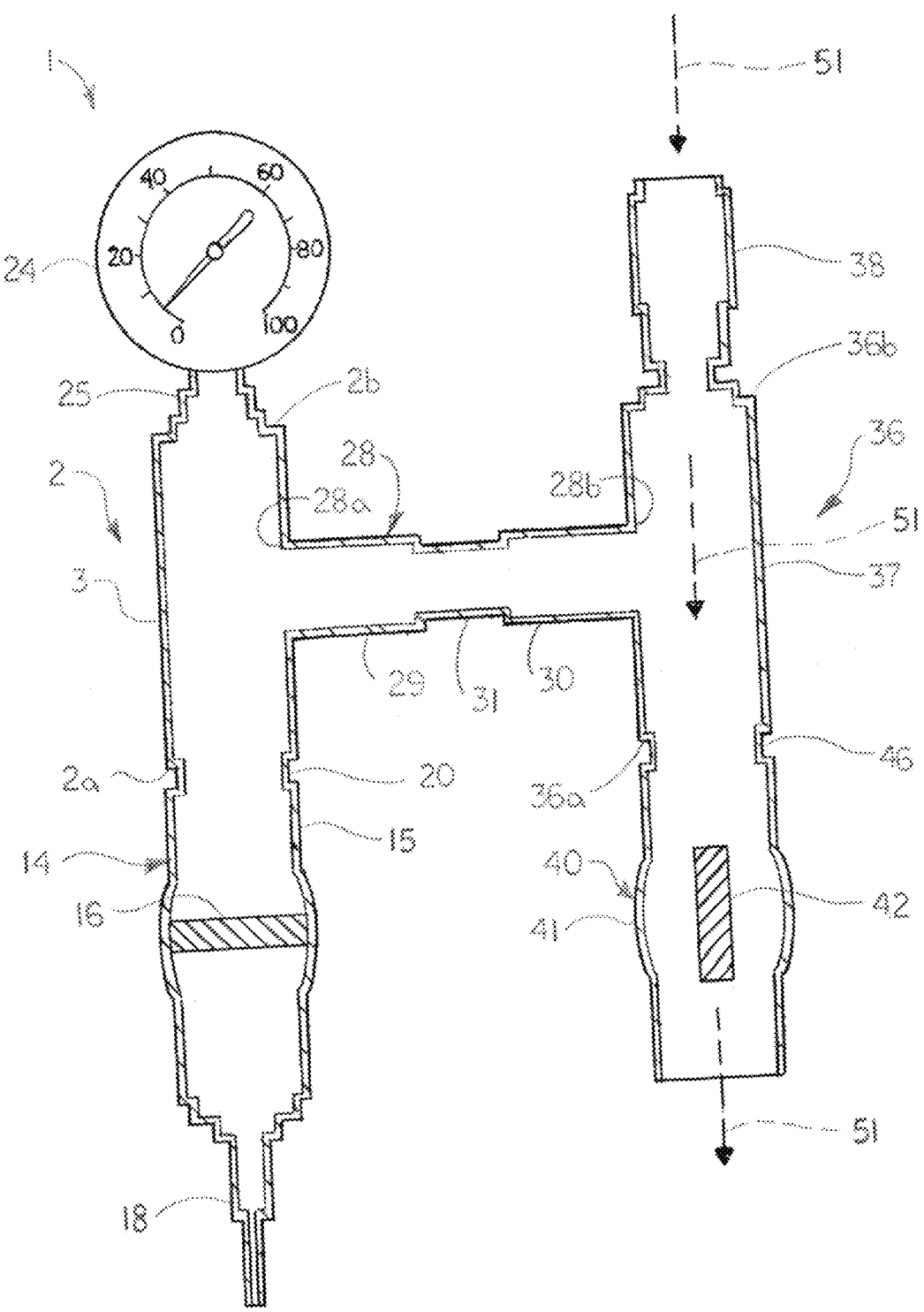
FIG. 6 is an enlarged sectioned interior view of the illustrative remote safety tire inflation apparatus, illustrating the typical flow of the tire bleed air through and discharge of the tire bleed air from the apparatus in the tire deflation mode.

As illustrated in FIGS. 2, 4 and 6, an air transit conduit 28 may establish pneumatic communication between the air outlet conduit 36 and the air inlet conduit 2. The air transit conduit 28 may include a first transit conduit end 28a disposed in fluid communication with the air inlet conduit 2 and a second transit conduit end 28b disposed in fluid communication with the air outlet conduit 36. In the tire inflation mode of the apparatus 1, the air transit conduit 28 may facilitate flow of the tire inflating air 50 from the air inlet conduit 2 into the air outlet conduit 36, as illustrated in FIG. 4.

In some embodiments, the air inlet conduit 2 and the air outlet conduit 36 may be substantially parallel and spaced-apart to each other. The air transit conduit 28 may be substantially perpendicular to the air inlet conduit 2 and to the air outlet conduit 36.

In some embodiments of the apparatus 1, at least one of the air inlet conduit 2, the air transit conduit 28 and the air outlet conduit 36 may include one or more discrete tubing segments. Accordingly, for example and without limitation, the air inlet conduit 2 may include a main inlet conduit segment tubing 3. The air inlet valve 14 and the air pressure gauge 24 may be disposed in pneumatic communication with the main inlet conduit segment tubing 3 at the respective first inlet conduit end 2a and second inlet conduit end 2b.

The air outlet conduit 36 may include a main outlet conduit segment tubing 37. The air bleed valve 40 may be disposed in pneumatic communication with the main outlet conduit segment tubing 37 at the first outlet conduit end 36a. The main outlet conduit segment tubing 37 may be configured for pneumatic connection to the pneumatic tire 67, typically via the air outlet hose 62, at the second outlet conduit end 36b.

The air transit conduit 28 may include a proximal transit conduit segment 29 which may extend from the main inlet conduit segment tubing 3 of the air inlet conduit 2 between the first inlet conduit end 2a and the second inlet conduit end 2b. A distal transit conduit segment 30 of the air transit conduit 28 may extend from the main outlet conduit segment tubing 37 of the air outlet conduit 36 between the first outlet conduit end 36a and the second outlet conduit end 36b. As illustrated in FIG. 2, a transit conduit connecting segment 31 may threadedly connect the distal transit conduit segment 30 to the proximal transit conduit segment 29 of the air transit conduit 28. The tubing segment or segments of the air inlet conduit 2, the air transit conduit 28 and/or the air outlet conduit 36 may include rubber, plastic, metal, composite material, polyvinyl chloride (PVC) piping or tubing or combinations thereof, for example and without limitation.

The air inlet valve 14 on the air inlet conduit 2 may have any valve design which renders the air inlet valve 14 selectively deployable in the open inlet valve position (FIG. 4) and the closed inlet valve position (FIG. 6). Accordingly, in some embodiments, the air inlet valve 14 may have an air inlet valve housing 15. The air inlet valve housing 15 may threadedly engage the main inlet segment tubing 3 of the air inlet conduit 2 via an inlet conduit connecting segment 20. As illustrated in FIGS. 4 and 6, an air inlet valve flap or baffle, hereinafter air inlet valve baffle 16, may be disposed in the air inlet valve housing 15. In the open inlet valve position, the air inlet valve baffle 16 may disengage the interior surfaces of the air inlet valve housing 15 and may be oriented parallel to the flow of the tire inflating air 50 as it flows through the air inlet valve 14. In the closed inlet valve position, the air inlet valve baffle 16 may be oriented perpendicular to the flow of the tire inflating air 50 and may engage the interior surfaces of the air inlet valve housing 15 in a pneumatic seal.

An air inlet valve handle 17 (FIG. 2) on the exterior of the air inlet valve housing 15 may operably engage the air inlet valve baffle 16. The air inlet valve handle 17 may be selectively manipulable to selectively position the air inlet valve baffle 16 in the open inlet valve position or the closed inlet valve position. As illustrated in FIG. 4, in the open inlet valve position of the air inlet valve 14, the air inlet valve baffle 16 may facilitate the substantially free and unhindered flow of the tire inflating air 50 from the air inlet hose 59 (FIG. 1) into the main inlet conduit segment tubing 3 of the air inlet conduit 2. In the closed inlet valve position of the air inlet valve 14, the air inlet valve baffle 16 may substantially block flow of the tire inflating air 50 from the air inlet hose 59 into the main inlet conduit segment tubing 3. In some embodiments, the air inlet valve 14 may include a solenoid valve which may be of the type which is known by those skilled in the art.

The air inlet valve 14 may include an inlet hose connector 18. The inlet hose connector 18 may facilitate pneumatically sealed connection of the air inlet hose 59 to the air inlet valve 14 typically according to the knowledge of those skilled in the art.

The air pressure gauge 24 may include any type of air pressure gauge which is configured to measure and indicate the pressure of the tire inflation air 50 or the tire bleed air 51 in the air inlet conduit 2. The air pressure gauge 24 may include a mechanical needle readout and/or a digital readout. The air pressure gauge 24 may have pressure readings which are within the possible inflation range of the pneumatic tire 67 on the wheel 66. For example and without limitation, in some embodiments, the air pressure gauge 24 may have pressure readings which are inclusive of or fall within the range of from about 0 psi to about 150 psi, and typically, from about 0 psi to about 100 psi. The air pressure gauge 24 may be attached to the main inlet conduit segment tubing 3 at the second inlet conduit end 2b of the air inlet conduit 2 in a pneumatically sealed manner typically using a pressure gauge fitting 25 suitable for the purpose.

The air bleed valve 40 on the air outlet conduit 36 may have any valve design which renders the air bleed valve 40 selectively deployable in the open bleed valve position (FIG. 6) and the closed bleed valve position (FIG. 4). Accordingly, in some embodiments, the air bleed valve 40 may have an air bleed valve housing 41. The air bleed valve housing 41 may threadedly engage the main outlet conduit segment tubing 37 of the air outlet conduit 36 via an outlet conduit connecting segment 46. As illustrated in FIGS. 4 and 6, an air bleed valve flap or baffle, hereinafter air bleed valve baffle 42, may be disposed in the air bleed valve housing 41. In the open bleed valve position, the air bleed valve baffle 42 may disengage the interior surfaces of the air bleed valve housing 41 and may be oriented parallel to the flow of the tire bleed air 51 as it flows through the air bleed valve 40. In the closed bleed valve position, the air bleed valve baffle 42 may be oriented perpendicular to the flow of the tire bleed air 51 and may engage the interior surfaces of the air bleed valve housing 41 in a pneumatic seal.

Figure 5:
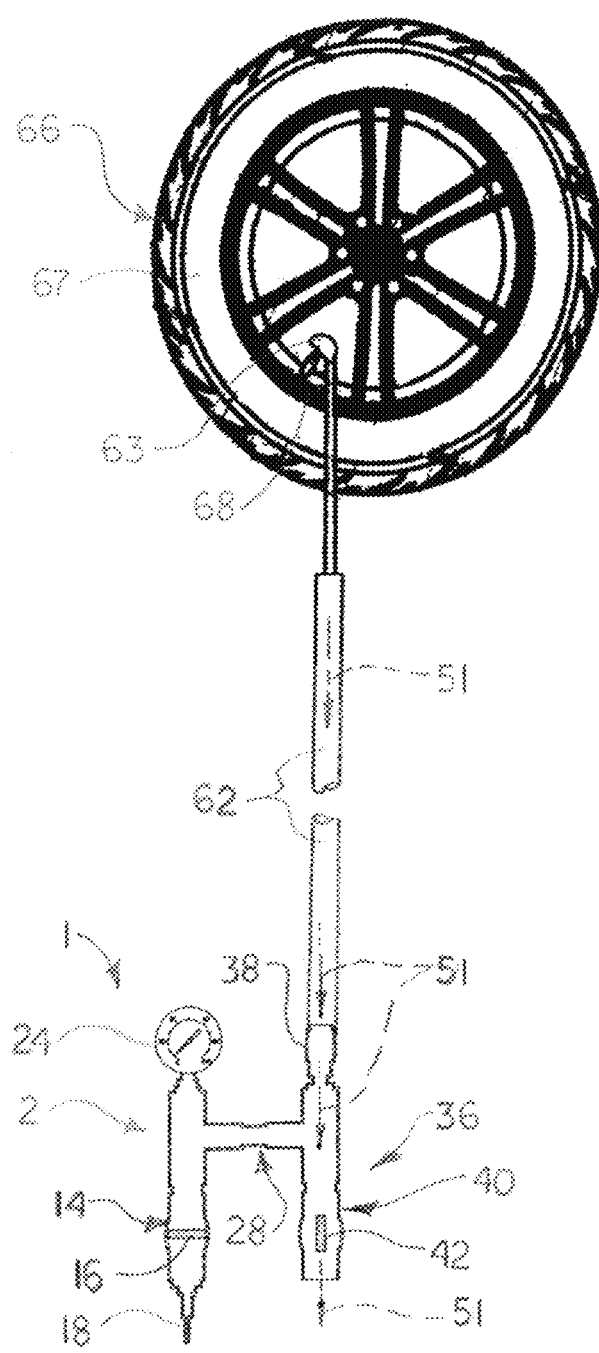
FIG. 5 is a sectioned interior view of the illustrative remote safety tire inflation apparatus, connected to the air compressor and coupled to the pneumatic tire, more particularly illustrating typical flow of tire bleed air from the pneumatic tire through the apparatus and discharge of the tire bleed air from the apparatus in operation of the apparatus in a tire deflation mode.

An air bleed valve handle 43 (FIG. 2) on the exterior of the air bleed valve housing 41 may operably engage the air bleed valve baffle 42. The air bleed valve handle 43 may be selectively manipulable to selectively position the air bleed valve baffle 42 in the open bleed valve position or the closed bleed valve position. As illustrated in FIG. 6, in the open bleed valve position of the air bleed valve 40, the air bleed valve baffle 42 may facilitate the substantially free and unhindered flow of the tire bleed air 51 from the air outlet hose 62 (FIG. 1) into and through the main outlet conduit segment tubing 37 of the air outlet conduit 36 and discharge of the tire bleed air 51 through the air bleed valve 40. In the closed discharge valve position of the air discharge valve 40, the air discharge valve baffle 42 may substantially block flow of the tire bleed air 51 from the air outlet hose 66 through the main outlet conduit segment tubing 37 and discharge of the tire bleed air 51 through the air bleed valve 40, respectively. In some embodiments, the air bleed valve 40 may include a solenoid valve which may be known by those skilled in the art. It will be appreciated by those skilled in the art that in the closed inlet valve position of the air inlet valve 14 and the open bleed valve position of the air bleed valve 40, as illustrated in FIGS. 5 and 6, the air bleed valve 40 may establish and facilitate a substantially unobstructed, unhindered and unimpeded pathway for free and unrestricted flow of the tire bleed air 51 from the pneumatic tire 67 through the valve stem 68, the air nozzle 63, the air outlet hose 62 and the air outlet conduit 36 and discharge of the tire bleed air 51 through the air bleed valve 40, respectively, to correspondingly reduce the pneumatic pressure of the pneumatic tire 67 from the initial tire pressure to the safe target tire pressure, as will be hereinafter further described. Flow of the tire bleed air 51 from the pneumatic tire 67 may subsequently be terminated by deployment of the bleed valve 40 from the open bleed valve position to the closed bleed valve position. In various embodiments, the air bleed valve 40 may comprise, consist essentially of, or consist of the air bleed valve housing 41; the air bleed valve baffle 42; and the air bleed valve handle 43.

The air outlet conduit 36 may include an outlet hose connector 38. The outlet hose connector 38 may facilitate pneumatically sealed connection of the air outlet hose 62 to the air outlet conduit 36 typically according to the knowledge of those skilled in the art. In some embodiments, the outlet hose connector 38 may be disposed in pneumatic communication with the main outlet conduit segment tubing 37 at the second outlet conduit end 36b of the air outlet conduit 36.

As illustrated in FIG. 1, in typical application, a user (not illustrated) may initially operate the apparatus 1 in the tire inflation mode to remotely inflate the pneumatic tire 67 on the wheel 66 at the safe distance D from the tire 67. For example and without limitation, in some applications, the pneumatic tire 67 may be of the racing tire type which is subjected to multiple uses. Proper inflation of these types of tires may require an initial tire pressure of typically about 60 psi to ensure that the bead of the tire 67 uniformly seats and seals against the wheel rim of the wheel 66. This relatively high initial tire pressure, however, may impart risk of blowout to the tire 67. The apparatus 1 may enable the user to both inflate the tire 67 in the tire inflation mode to the initial tire pressure and subsequently reduce the air pressure of the tire 67 to a safe target tire pressure in the tire deflation mode before the user approaches the tire 66 to disconnect the air nozzle 63 from the valve stem 68.

The air inlet valve 14 on the air inlet conduit 2 of the apparatus 1 may be pneumatically connected to the air compressor 58 typically through the air inlet hose 59. The air inlet hose 62 may be pneumatically connected to the air outlet conduit 36 of the apparatus 1 typically through the air outlet hose 62. The length of the air inlet hose 62 may be at least as long as the safe distance D between the tire 67 and the apparatus 1 during inflation of the tire 67. For example and without limitation, in some applications, the safe distance D may be at least about 10 feet. The air nozzle 63 on the air inlet hose 62 may be pneumatically coupled to the valve stem 68 on the pneumatic tire 67, typically in the conventional manner. In some applications, the wheel 66 may be placed inside a tire cage (not illustrated) for additional safety, as is known by those skilled in the art.

Figure 3:
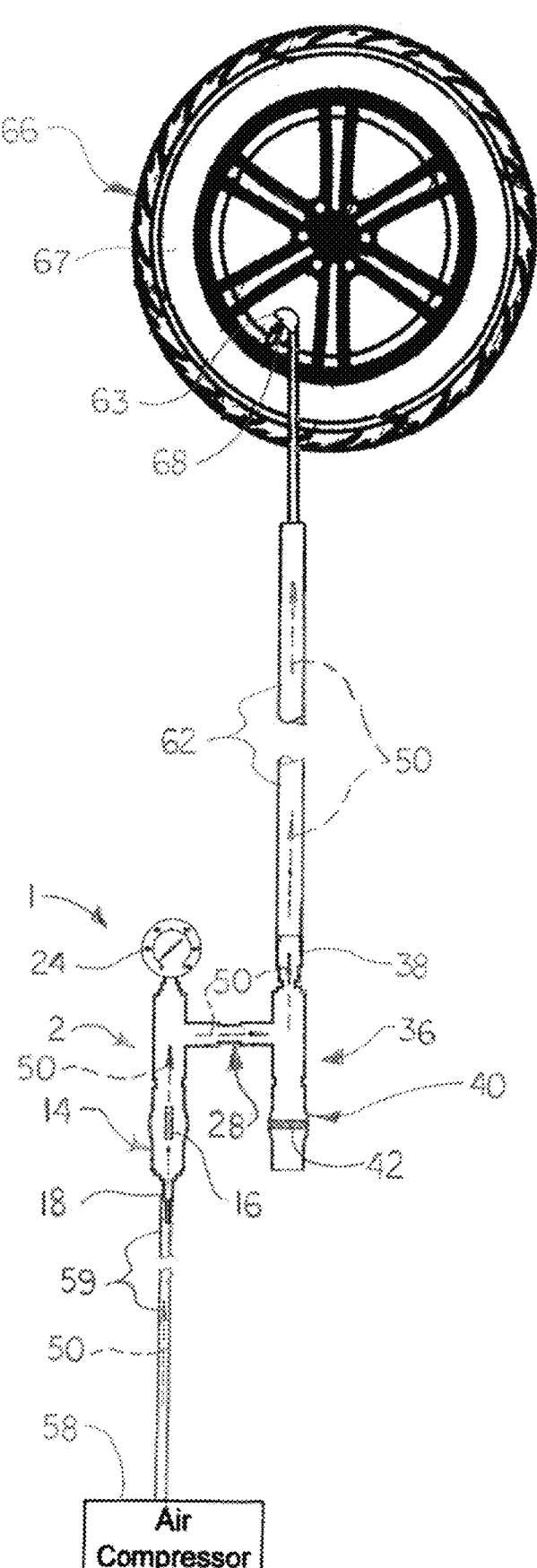
FIG. 3 is a sectioned interior view of the illustrative remote safety tire inflation apparatus, connected to the air compressor and coupled to the pneumatic tire, more particularly illustrating typical flow of tire inflating air from the air compressor, through the apparatus to the pneumatic tire, respectively, in operation of the apparatus in a tire inflation mode.

As illustrated in FIGS. 3 and 4, the air inlet valve 14 may be deployed in the open inlet valve position and the air bleed valve 40 deployed in the closed bleed valve position. The air compressor 58 may be operated to pump the tire inflating air 50 through the air inlet hose 59 and through the opened air inlet valve 14, the air inlet conduit 2, the air transit conduit 28 and the air outlet conduit 36, respectively, of the apparatus 1; and through the air outlet hose 62 and the air nozzle 63 into the pneumatic tire 67, respectively. The air pressure gauge 24 may simultaneously measure and indicate the pressure of the tire inflating air 50 and the tire pressure. Flow of the tire inflating air 50 into the pneumatic tire 67 may be continued until the initial tire pressure, typically about 60 psi, is reached, as indicated on the air pressure gauge 24. At that time, the air inlet valve 14 may be deployed from the open inlet valve position to the closed inlet valve position to terminate further flow of the tire inflating air 50 from the air compressor 58 through the air inlet hose 59 into and through the air inlet valve 14. Further operation of the air compressor 58 may be terminated.

As illustrated in FIGS. 5 and 6, the apparatus 1 may subsequently be operated in the tire deflation mode to reduce the pressure of the tire 67 from the initial tire pressure to the safe target tire pressure. Accordingly, the air bleed valve 40 may next be deployed from the closed valve position to the open valve position to establish and facilitate the substantially unobstructed, unhindered and unimpeded pathway for free and unrestricted flow of the tire bleed air 51 from the pneumatic tire 67 through the valve stem 68, the air nozzle 63, the air outlet hose 62 and the air outlet conduit 36 and discharge of the tire bleed air 51 through the air bleed valve 40, respectively, of the apparatus 1. The air bleed valve 40 may remain open until the pneumatic pressure of the pneumatic tire 67, as indicated on the air pressure gauge 24, drops to the safe target tire pressure, typically about 30 psi, at which time the bleed valve 40 may be deployed from the open bleed valve position back to the closed bleed valve position. The user may then safely approach the inflated pneumatic tire 67 to disconnect the air nozzle 63 from the valve stem 68 on the pneumatic tire 67.

Referring next to FIGS. 7-13 of the drawings, an alternative illustrative embodiment of the remote safety tire inflation apparatuses is generally indicated by reference numeral 101. Unless otherwise indicated, elements of the apparatus 101 which are structurally and/or functionally analogous to the respective elements of the apparatus 1 that was heretofore described with respect to FIGS. 1-6 are designated by the same respective reference numerals in the 101-199 series in FIGS. 7-13. Accordingly, to the extent which is applicable, the same description which was heretofore described with respect to the apparatus 1 is incorporated by reference herein in its entirety herein with respect to the apparatus 101.

The apparatus 101 may include an apparatus block 170. In some embodiments, the apparatus block 170 may be fabricated of a solid or semisolid material such as rubber, metal, plastic or composite material, for example and without limitation. In some embodiments, the apparatus block 170 may be fabricated from or in a single piece of material using molding, casting, milling, machining, 3D printing and/or other manufacturing techniques known by those skilled in the art.

In some embodiments, the apparatus block 170 of the apparatus 101 may be square or rectangular in shape.

Figure 8:
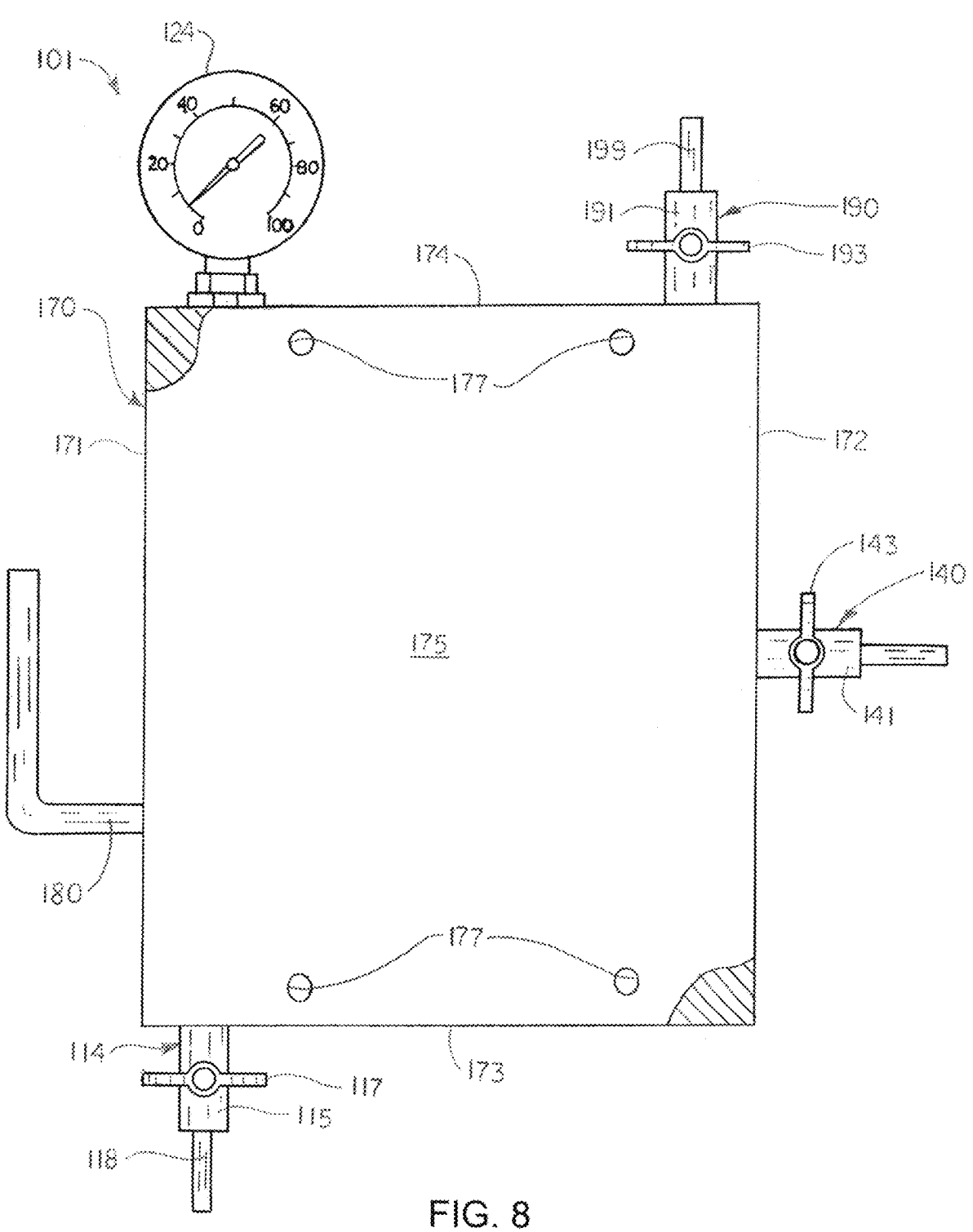
FIG. 8 is a front view of the illustrative remote safety tire inflation apparatus illustrated in FIG. 7.

Accordingly, as illustrated in FIG. 8, the apparatus block 170 may have a first side block surface 171 and an opposite, parallel second side block surface 172. An air inlet surface 173 and an opposite, parallel air outlet surface 174 may extend from the first side block surface 171 to the second side block surface 172. A front block surface 175 and an opposite, parallel rear block surface 176 (FIG. 12) may be bound or circumscribed by the first side block surface 171, second side block surface 172, air inlet surface 173 and air outlet surface 174.

Figure 9:
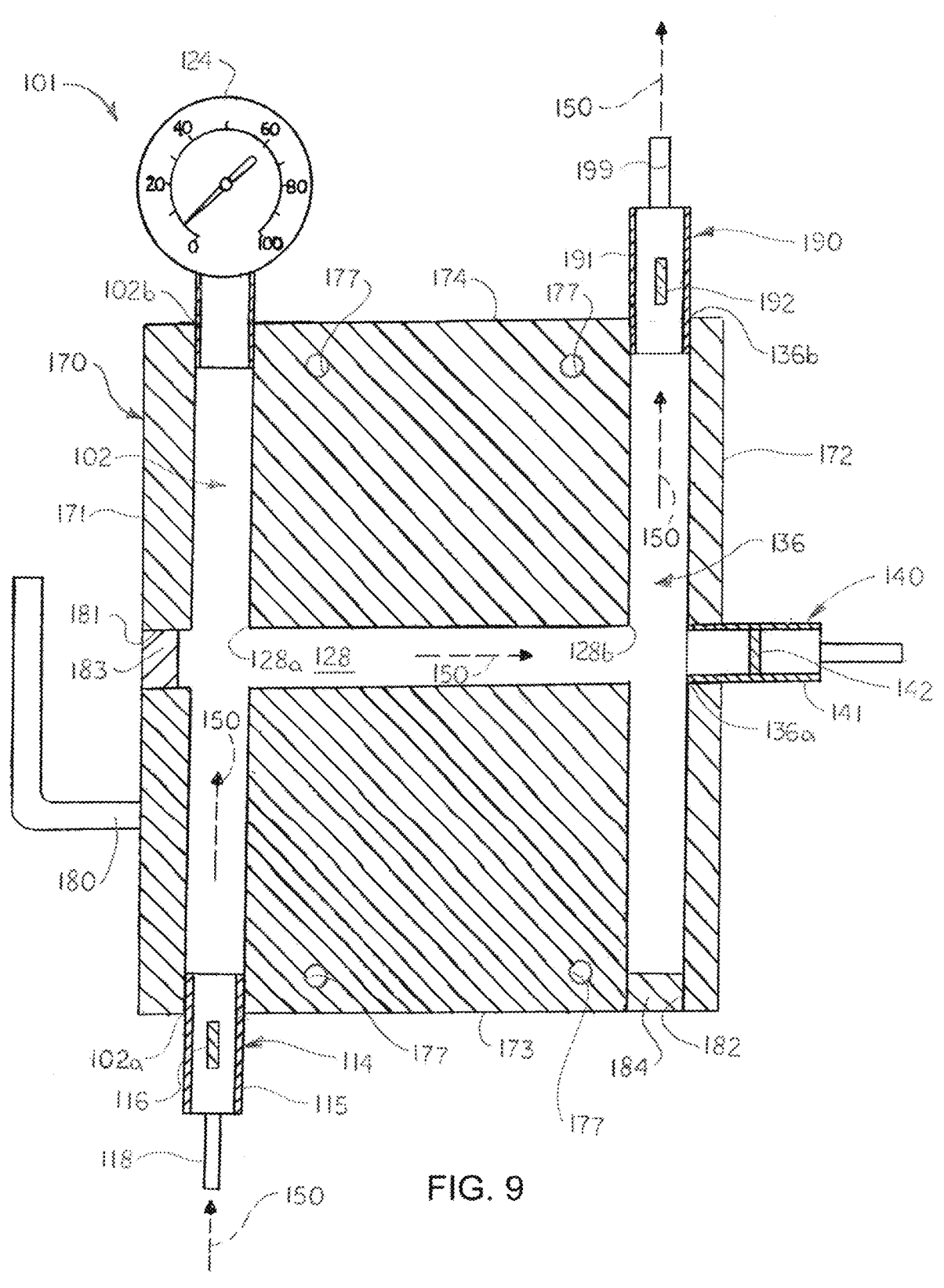
FIG. 9 is a sectional view of the illustrative remote safety tire inflation apparatus illustrated in FIG. 7, illustrating typical flow of tire inflating air through the apparatus in operation of the apparatus in a tire inflation mode.
Figure 10:
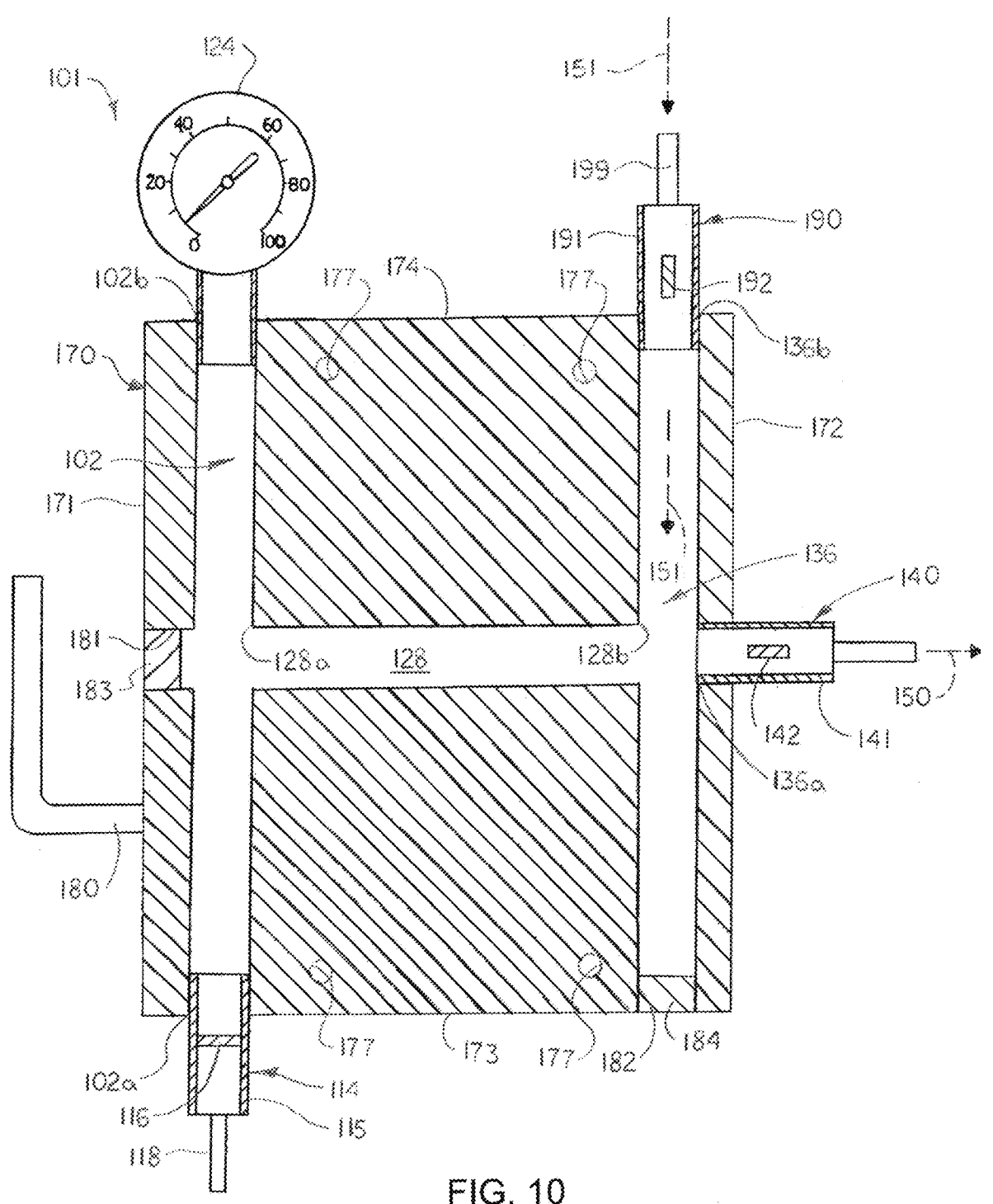
FIG. 10 is a sectional view of the illustrative remote safety tire inflation apparatus illustrated in FIG. 7, illustrating typical flow of tire bleed air through and discharge of the tire bleed air from the apparatus in operation of the apparatus in a tire deflation mode.

As illustrated in FIGS. 9 and 10, the air inlet conduit 102, the air transit conduit 128 and the air outlet conduit 136 of the apparatus 101 may extend within the apparatus block 170. The air inlet conduit 102 may extend between the air inlet surface 173 and the air outlet surface 174 of the apparatus block 170, with the first inlet conduit end 102a typically opening to the air inlet surface 173 and the second inlet conduit end 102b typically opening to the air outlet surface 174. The air inlet valve 114 may be disposed in pneumatic communication with the first inlet conduit end 102a at the air inlet surface 173. The air pressure gauge 124 may be disposed in pneumatic communication with the second inlet conduit end 102b at the air outlet surface 174.

In some embodiments, the apparatus 101 may include an air outlet valve 190 disposed in pneumatic communication with the air outlet conduit 136. The air outlet valve 190 may be configured for pneumatic connection to the valve stem 168 (FIG. 7) on the pneumatic tire 167, typically through the air outlet hose 162. The air outlet valve 190 may be selectively deployable in an open outlet valve position, illustrated in FIGS. 9 and 10, and a closed outlet valve position (not illustrated). In the tire inflation mode of the apparatus 101, illustrated in FIG. 9, the air outlet valve 190 in the open outlet valve position may be configured to facilitate substantially free and unhindered flow of the tire inflating air 150 (FIG. 9) from the air compressor 158 (FIG. 7) through the air inlet hose 159, the apparatus 101 and the air outlet hose 162 into the pneumatic tire 167 through the valve stem 168, respectively. The air outlet valve 190 in the closed outlet valve position may be configured to substantially block flow of the tire inflating air 150 from the air inlet hose 159 through the apparatus 101 to the air outlet hose 162. In the tire deflation mode of the apparatus 101, illustrated in FIG. 10, the opened air outlet valve 190 may facilitate substantially free and unhindered flow of the tire bleed air 151 from the pneumatic tire 167 through the valve stem 168, the air outlet hose 162 and the apparatus 101 and discharge of the tire bleed air 151 from the apparatus 101 through the opened air bleed valve 140.

The air outlet valve 190 may have any valve design which renders the air outlet valve 190 selectively deployable in the open outlet valve position and the closed inlet valve position. Accordingly, in some embodiments, the air outlet valve 190 may have a design which is the same as or similar to that of the air inlet valve 114 and the air bleed valve 140, typically with an air outlet valve housing 191 which threadedly engages the second outlet conduit end 136b of the air outlet conduit 136 at the air outlet surface 174 of the apparatus block 170; an air outlet valve baffle 192 disposed in the air outlet valve housing 191; and an air outlet valve handle 193 (FIG. 8) which engages the air outlet valve baffle 192 to deploy the air outlet valve baffle 192 between the open and closed outlet valve positions. In the open outlet valve position, the air outlet valve baffle 192 may disengage the interior surfaces of the air outlet valve housing 191 and may be oriented parallel to the flow of the tire inflating air 150 or the tire bleed air 151 as it flows through the air outlet valve 190. In the closed outlet valve position, the air outlet valve baffle 192 may be oriented perpendicular to the flow of the tire inflating air 150 or the tire bleed air 151 and may engage the interior surfaces of the air outlet valve housing 191 in a pneumatic seal.

The air outlet valve 190 may include an outlet hose connector 199. The outlet hose connector 199 may facilitate pneumatically sealed connection of the air outlet hose 162 to the air outlet valve 190 typically according to the knowledge of those skilled in the art.

The air inlet conduit 102, the air transit conduit 128 and the air outlet conduit 136 may be provided in the apparatus block 170 of the apparatus 101 using any suitable method or technique known by those skilled in the art. For example and without limitation, as further illustrated in FIGS. 9 and 10, in some embodiments, the apparatus block 170 may be molded, cast and/or otherwise fabricated from a single solid piece of material. The air inlet conduit 102 and the air outlet conduit 136 may be drilled from the air inlet surface 173 to the air outlet surface 174. The air transit conduit 128 may be cross drilled from the first side block surface 171 to the second side block surface 172 in intersecting relationship to the air inlet conduit 102 and the air outlet conduit 136. A first auxiliary port 181 may thus be formed in the apparatus block 170 from the first side block surface 171 to the air transit conduit 128. A first port plug 183 may be threaded and/or otherwise fitted in the first auxiliary port 181. A second auxiliary port 182 may be formed at the open interface of the air outlet conduit 136 onto the air inlet surface 173 of the apparatus block 170. A second port plug 184 may be threaded and/or otherwise fitted in the second auxiliary port 182. The first outlet conduit end 136a of the air outlet conduit 136 may be disposed at the second side block surface 172 of the apparatus block 170. The air bleed valve housing 141 of the air bleed valve 140 may be fitted in the first outlet conduit end 136a. In some embodiments, the second auxiliary port 182 with the second port plug 184 may alternatively be disposed at the second side block surface 172, opposite the first auxiliary port 181 and first port plug 183. The first outlet conduit end 136a with the air bleed valve 140 may thus be disposed at the air inlet surface 173 of the apparatus block 170, opposite the air outlet valve 190.

In some embodiments, the apparatus block 170 may be fabricated in two or more block sections (not illustrated) which may be fastened, welded and/or otherwise attached to each other typically according to the knowledge of those skilled in the art. Prior to fastening of the block sections, the complementary half sections of the air inlet conduit 102, the air transit conduit 128 and the air outlet conduit 136 may be drilled, milled, casted, molded and/or otherwise formed or shaped in the respective block sections typically according to those skilled in the art. The air inlet valve 114, the air pressure gauge 124, the air bleed valve 140 and the air outlet valve 190 may be fitted in place to complete assembly of the apparatus 101.

Figure 7:
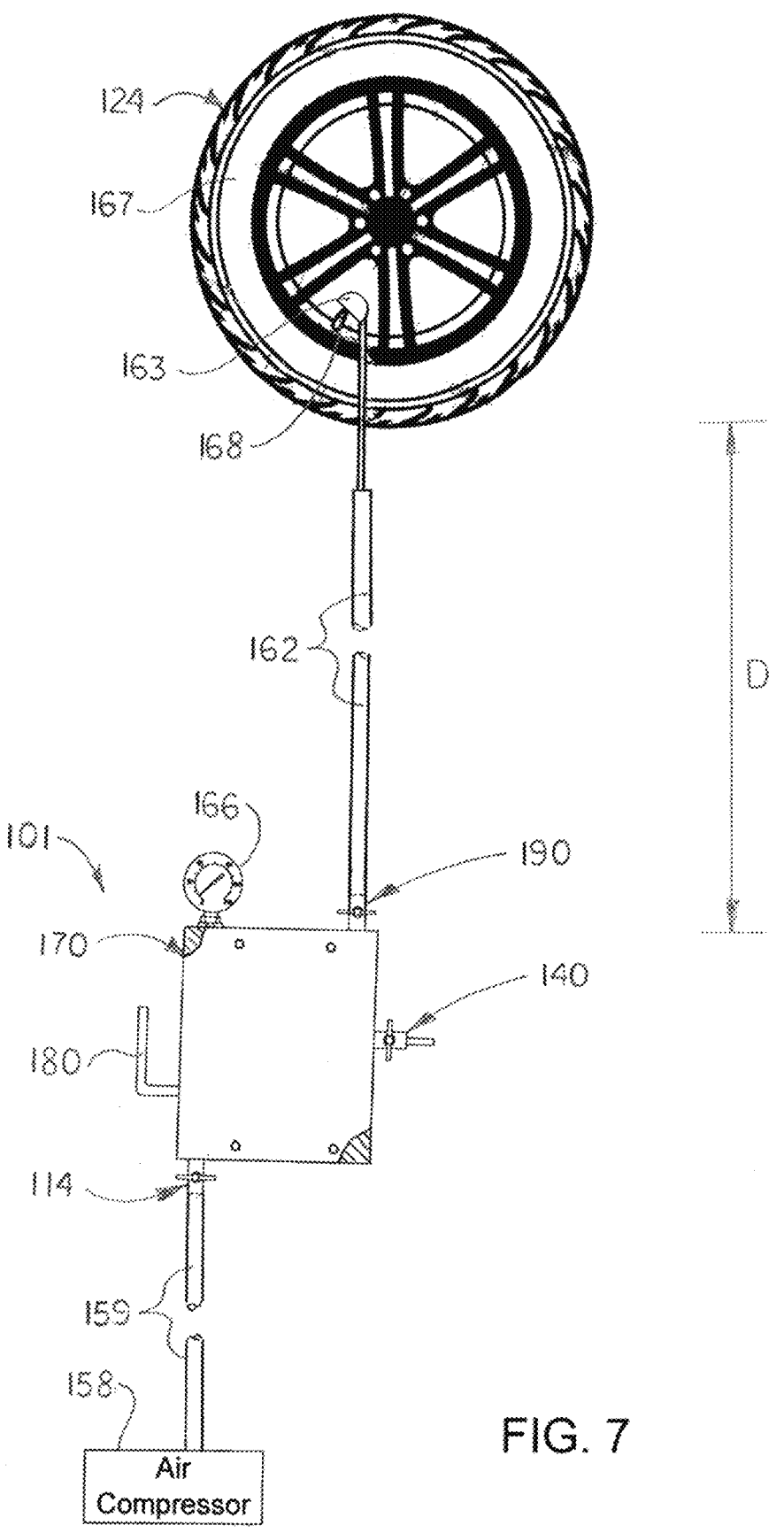
FIG. 7 is a front view of an alternative illustrative embodiment of the remote safety tire inflation apparatuses, with an air compressor connected to the apparatus and the apparatus pneumatically coupled to a valve stem on a pneumatic tire in typical application of the apparatus.

As illustrated in FIGS. 7, 9 and 10, operation of the apparatus 101 may be as was heretofore described with respect to operation of the apparatus 1 in FIGS. 1-6. The air outlet hose 162 may be pneumatically connected to the air outlet valve 190 of the apparatus 101 typically via the outlet hose connector 199 (FIGS. 8-10), and the apparatus 101 placed at the safe distance D from the tire 167. In the tire inflation mode of the apparatus 101, illustrated in FIG. 9, the air inlet valve 114 may be deployed in the open inlet valve position and the air outlet valve 190 may be deployed in the open outlet valve position, whereas the air bleed valve 140 may be deployed in the closed bleed valve position. The tire inflation air 150 may flow from the air compressor 158 (FIG. 7) through the air inlet hose 159, the opened air inlet valve 114, the air inlet conduit 102, the air transit conduit 128, the air outlet conduit 136, the opened air outlet valve 190, the air outlet hose 162 and the air nozzle 163, respectively, and through the valve stem 168 into the pneumatic tire 167, respectively, as the air pressure gauge 124 measures and indicates the pressure of the tire inflation air 150. When the tire pressure of the tire 167 reaches the initial tire pressure, typically about 60 psi, as indicated by the air pressure gauge 124, the apparatus 101 may be operated in the tire deflation mode. Accordingly, as illustrated in FIG. 10, the air inlet valve 114 may be deployed to the closed inlet valve position, and the air bleed valve 140 may be deployed from the closed bleed valve position to the open bleed valve position. The tire bleed air 151 may thus flow in an unhindered and unobstructed manner from the pneumatic tire 167 through the valve stem 168, the air nozzle 163, the air outlet hose 162, the opened air outlet valve 190 and the air outlet conduit 136 and discharge through the opened air bleed valve 140 until the tire pressure of the pneumatic tire 167 reaches the safe target tire pressure, typically about 30 psi, as indicated by the air pressure gauge 124. The air bleed valve 140 and/or the air outlet valve 190 may then be closed to terminate further flow of the bleed air 151 from the pneumatic tire 167 through the air outlet hose 162 and deflation of the tire 167. The user of the apparatus 101 may then safely approach the tire 167 to uncouple the air nozzle 163 from the valve stem 168.

Figure 11:
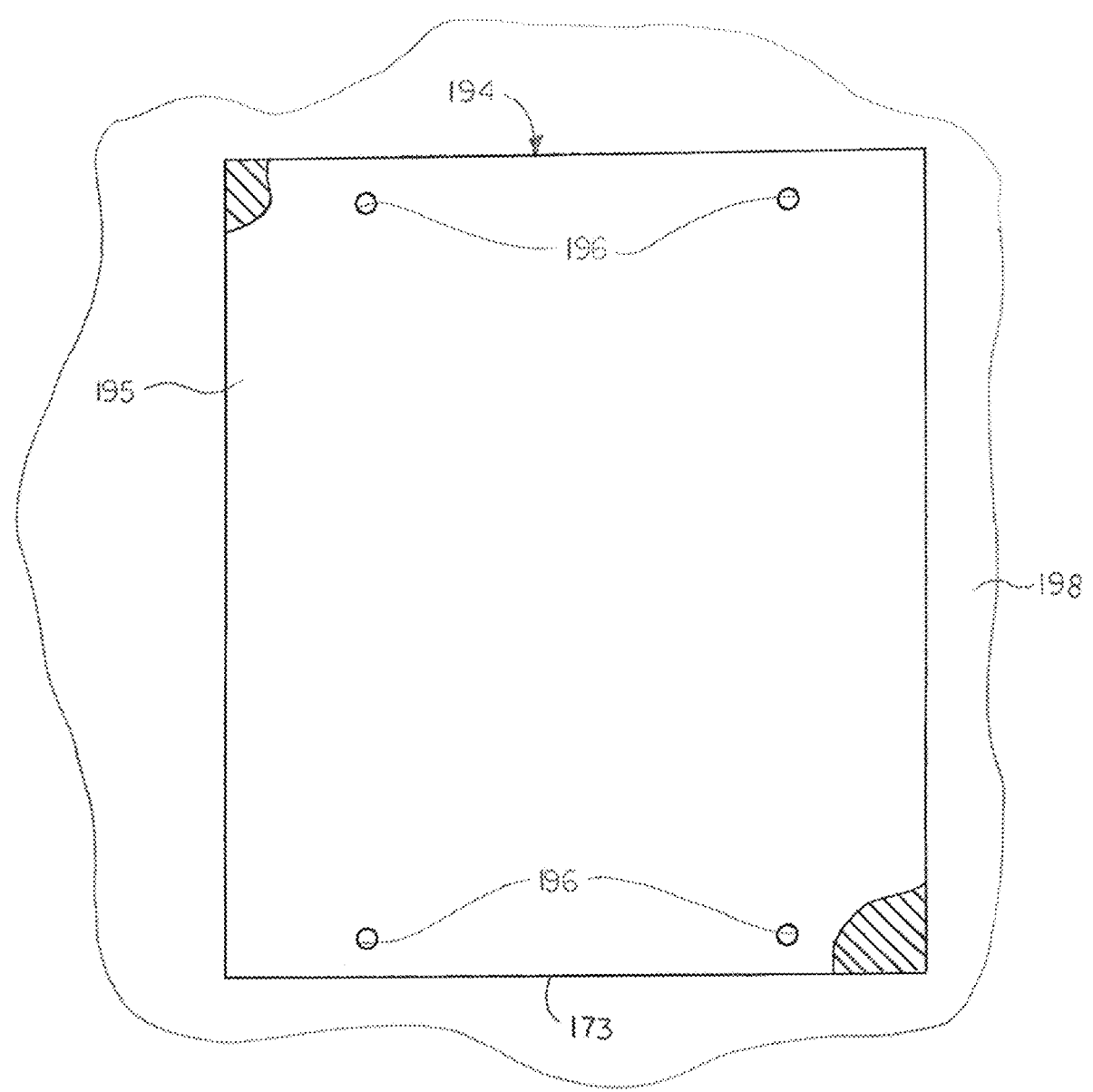
FIG. 11 is a front view of a typical apparatus mount rack suitable for supporting the illustrative remote safety tire inflation apparatus illustrated in FIG. 7 when the apparatus is not in use, with the apparatus mount rack attached to a wall (partially in section)
Figure 12:
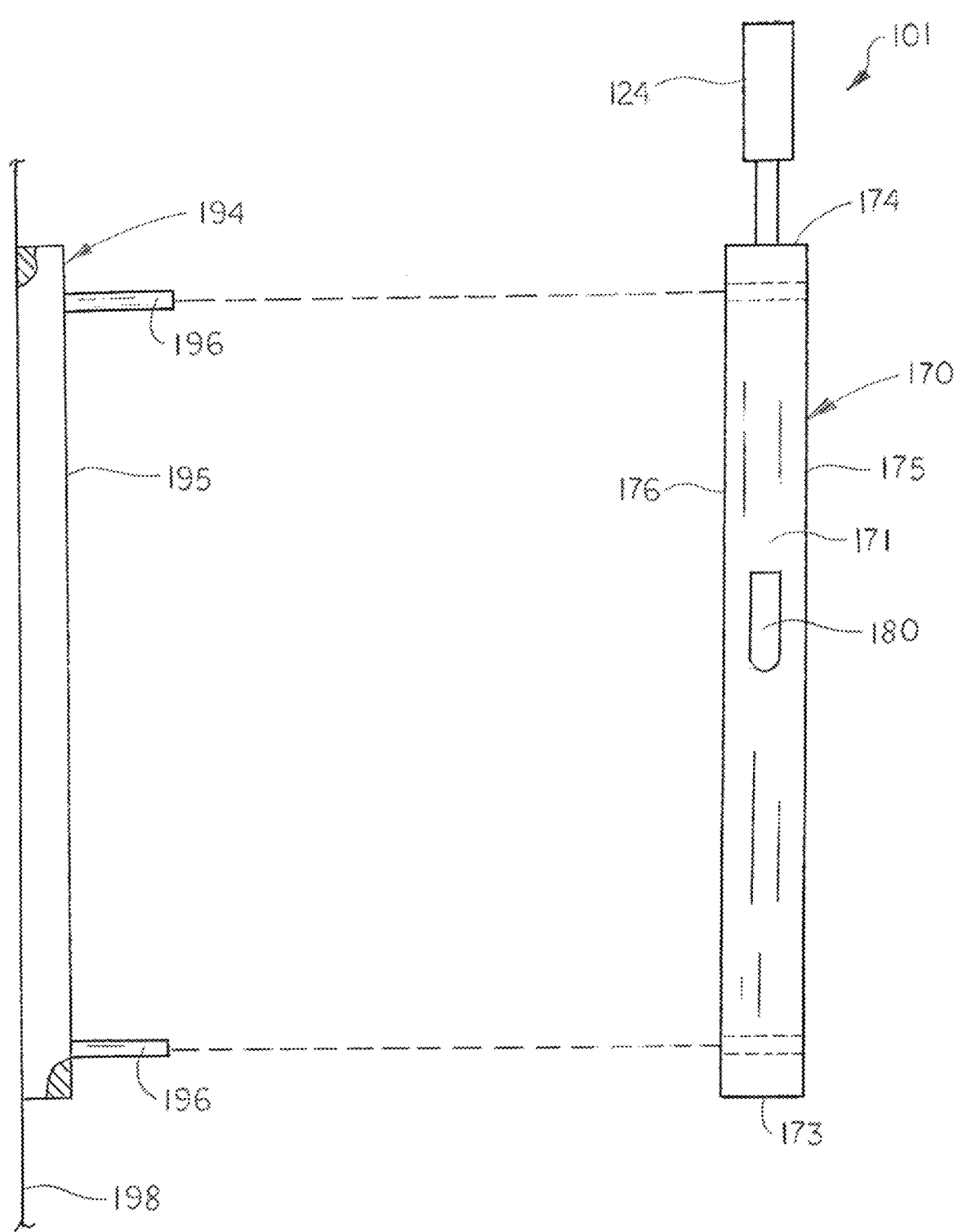
FIG. 12 is an exploded side view of the apparatus mount rack illustrated in FIG. 11 attached to the wall (partially in section), more particularly illustrating typical deployment of the remote safety tire inflation apparatus in place on the rack.
Figure 13:
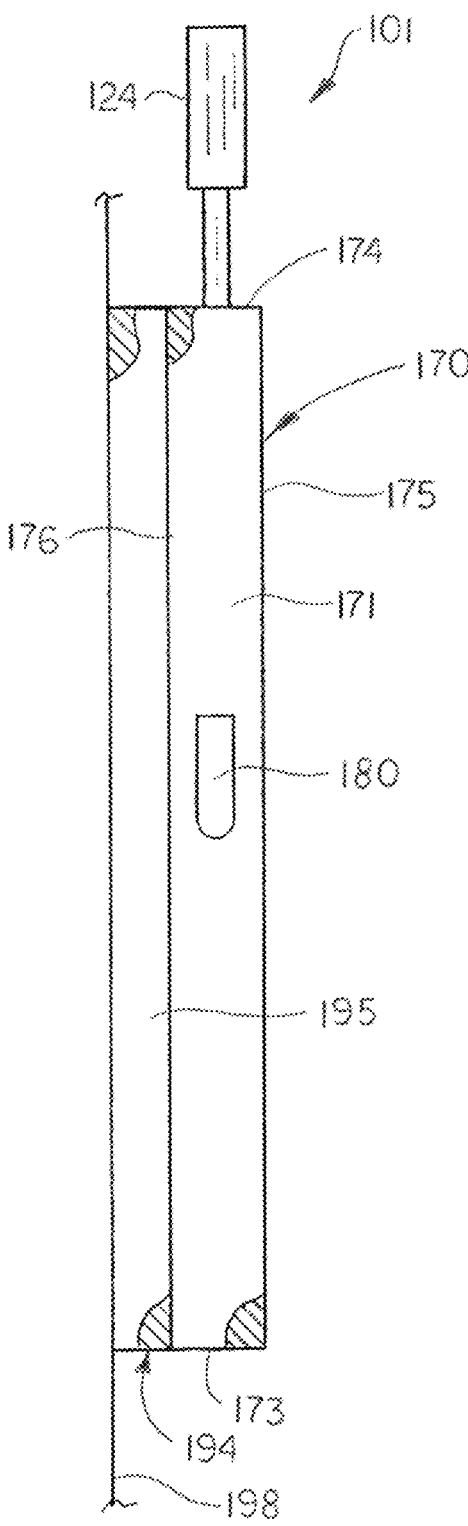
FIG. 13 is a side view of the remote safety tire inflation apparatus deployed in place on the apparatus mount rack.

As illustrated in FIGS. 11-13, in some embodiments, the apparatus 101 may include an apparatus mount rack 194. The apparatus mount rack 194 may be suitable for supporting the apparatus 101 when the apparatus 101 is not in use. Accordingly, the apparatus mount rack 194 may include a rack base 195. The rack base 195 may be suitably configured to engage a wall 198 or other support structure (not illustrated). At least one rack peg 196 may extend from the rack base 195.

As illustrated in FIGS. 8-10, at least one peg opening 177 may extend through the apparatus block 170 of the apparatus 101 from the front block surface 175 to the rear block surface 176. The peg opening 177 may be suitably sized and configured to receive the rack peg 196. A carrying handle 180 may extend from the apparatus block 170, such as at the first side block surface 171, for example and without limitation. Accordingly, as illustrated in FIGS. 12 and 13, when not in use, the apparatus 101 may be stowed on the apparatus mount rack 194 typically by aligning or registering the peg opening or openings 177 in the apparatus block 170 with the respective rack peg or pegs 196 on the rack base 195 of the apparatus mount rack 194 and placing the apparatus block 170 on the rack pegs 196 as the rack pegs 196 insert through the respective peg opening 177. The apparatus 101 may be removed from the apparatus mount rack 194 for use, typically by grasping the carrying handle 180. It will be recognized and understood that alternative techniques may be used to removably support the apparatus 101 on the apparatus mount rack 194. These may include but are not limited to magnets, brackets, clamps, tongue in groove devices, and the like.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A remote safety tire inflation apparatus configured for pneumatic connection to an air compressor to remotely inflate a pneumatic tire to an initial tire pressure and subsequently deflate the pneumatic tire to a target tire pressure, the remote safety tire inflation apparatus comprising:

an air inlet valve configured for pneumatic connection to the air compressor, the air inlet valve selectively deployable in an open inlet valve position and a closed inlet valve position;

an air inlet conduit comprising a first inlet conduit end disposed in pneumatic communication with the air inlet valve and a second inlet conduit end opposite the first inlet conduit end;

an air pressure gauge disposed in pneumatic communication with the second inlet conduit end of the air inlet conduit, the air pressure gauge configured to measure and indicate pressure of air in the air inlet conduit;

an air transit conduit comprising a first transit conduit end disposed in fluid communication with the air inlet conduit between the first inlet conduit end and the second inlet conduit end and a second transit conduit end opposite the first transit conduit end;

an air outlet conduit comprising a first outlet conduit end and a second outlet conduit end opposite the first outlet conduit end, the air outlet conduit disposed in pneumatic communication with the second transit conduit end of the air transit conduit between the first outlet conduit end and the second outlet conduit end, the second outlet conduit end of the air outlet conduit configured for pneumatic connection to the pneumatic tire;

wherein the air inlet conduit and the air outlet conduit are parallel and spaced-apart to each other and the air transit conduit is perpendicular to the air inlet conduit and to the air outlet conduit; and an air bleed valve disposed in pneumatic communication with the first outlet conduit end of the air outlet conduit, the air bleed valve selectively deployable in an open bleed valve position and a closed bleed valve position, the air bleed valve configured to facilitate substantially free and unhindered discharge of tire bleed air from the air outlet conduit in the open bleed valve position and substantially block discharge of tire bleed air from the air outlet conduit in the closed bleed valve position.

2. The apparatus of claim 1 wherein each of the air inlet conduit and the air outlet conduit comprises discrete tubing segments.

3. The apparatus of claim 2 wherein the air inlet conduit comprises a main inlet conduit segment tubing, and the air inlet valve and the air pressure gauge are disposed in pneumatic communication with the main inlet conduit segment tubing.

4. The apparatus of claim 2 wherein the air outlet conduit comprises a main outlet conduit segment tubing, and the main outlet conduit segment tubing is configured for pneumatic connection to the pneumatic tire and the air bleed valve is disposed in pneumatic communication with the main outlet conduit segment.

5. The apparatus of claim 1 further comprising an apparatus block, and wherein the air inlet conduit, the air transit conduit and the air outlet conduit extend within the apparatus block.

6. The apparatus of claim 5 wherein the apparatus block is rubber, metal, plastic, composite material or combinations thereof.

7. The apparatus of claim 5 further comprising an apparatus mount rack configured to support the apparatus block.

8. The apparatus of claim 5 further comprising at least one peg opening in the apparatus block, and wherein the apparatus mount rack comprises a rack base and at least one rack peg on the rack base, the at least one rack peg configured for extension through the at least one peg opening to support the apparatus block on the rack base.

9. A remote safety tire inflation apparatus configured for pneumatic connection to an air compressor to remotely inflate a pneumatic tire to an initial tire pressure and subsequently deflate the pneumatic tire to a target tire pressure, the remote safety tire inflation apparatus comprising:

an apparatus block comprising an air inlet surface and an air outlet surface opposite the air inlet surface;

an air inlet valve at the air inlet surface of the apparatus block, the air inlet valve configured for pneumatic connection to the air compressor, the air inlet valve selectively deployable in an open inlet valve position and a closed inlet valve position;

an air inlet conduit extending within the apparatus block, the air inlet conduit comprising a first inlet conduit end opening to the air inlet surface and disposed in pneumatic communication with the air inlet valve and a second inlet conduit end opening opposite the first inlet conduit end opening and opening to the air outlet surface;

an air pressure gauge carried by the apparatus block at the air outlet surface and disposed in pneumatic communication with the second inlet conduit end opening of the air inlet conduit, the air pressure gauge configured to measure and indicate pressure of air in the air inlet conduit;

an air outlet conduit extending within the apparatus block, the air outlet conduit having a first outlet conduit end and a second outlet conduit end, the air outlet conduit disposed in pneumatic communication with the air inlet conduit between the first outlet conduit end and the second outlet conduit end, the second outlet conduit end of the air outlet conduit discharging at the air outlet surface of the apparatus block and configured for pneumatic connection to the pneumatic tire; and an air bleed valve disposed in pneumatic communication with the air outlet conduit, the air bleed valve selectively deployable in an open bleed valve position and a closed bleed valve position, the air bleed valve configured to facilitate substantially free and unhindered discharge of tire bleed air from the air outlet conduit in the open bleed valve position and substantially block discharge of tire bleed air from the air outlet conduit in the closed bleed valve position.

10. The apparatus of claim 9 wherein the air bleed valve is disposed in pneumatic communication with the first outlet conduit end of the air outlet conduit.

11. The apparatus of claim 9 further comprising an air transit conduit establishing pneumatic communication between the air outlet conduit and the air inlet conduit.

12. The apparatus of claim 11 wherein the air transit conduit comprises a first transit conduit end disposed in fluid communication with the air inlet conduit and a second transit conduit end disposed in fluid communication with the air outlet conduit.

13. The apparatus of claim 11 wherein the apparatus block is rubber, metal, plastic, composite material or combinations thereof.

14. The apparatus of claim 11 further comprising an apparatus mount rack configured to support the apparatus block.

15. A remote safety tire inflation apparatus configured for pneumatic connection to an air compressor to remotely inflate a pneumatic tire to an initial tire pressure and subsequently deflate the pneumatic tire to a target tire pressure, the remote safety tire inflation apparatus comprising:

an apparatus block comprising an air inlet surface, an air outlet surface opposite the air inlet surface, opposite first and second side block surfaces extending from the air inlet surface to the air outlet surface, a front block surface and a rear block surface;

an air inlet conduit extending within the apparatus block, the air inlet conduit having a first inlet conduit end opening to the air inlet surface and a second inlet conduit end opening to the air outlet surface;

an air inlet valve disposed in pneumatic communication with the first inlet conduit end of the air inlet conduit at the air inlet surface of the apparatus block, the air inlet valve configured for pneumatic connection to the air compressor, the air inlet valve selectively deployable in an open inlet valve position and a closed inlet valve position;

an air pressure gauge carried by the apparatus block at the air outlet surface and disposed in pneumatic communication with the second inlet conduit end of the air inlet conduit, the air pressure gauge configured to measure and indicate pressure of air in the air inlet conduit;

an air transit conduit extending within the apparatus block, the air transit conduit having a first transit conduit end disposed in pneumatic communication with the air inlet conduit between the first inlet conduit end and the second inlet conduit end and a second transit conduit end opposite the first transit conduit end;

an air outlet conduit extending within the apparatus block, the air outlet conduit having a first outlet conduit end and a second outlet conduit end at the air outlet surface of the apparatus block, the air outlet conduit disposed in pneumatic communication with the air transit conduit between the first outlet conduit end and the second outlet conduit end, the air outlet conduit discharging at the air outlet surface of the apparatus block and configured for pneumatic connection to the pneumatic tire; and an air bleed valve disposed in pneumatic communication with the first outlet conduit end of the air outlet conduit, the air bleed valve selectively deployable in an open bleed valve position and a closed bleed valve position, the air bleed valve configured to facilitate substantially free and unhindered discharge of tire bleed air from the air outlet conduit in the open bleed valve position and substantially block discharge of the tire bleed air from the air outlet conduit in the closed bleed valve position.

* * * * *